UNITED STATES PATENT OFFICE.

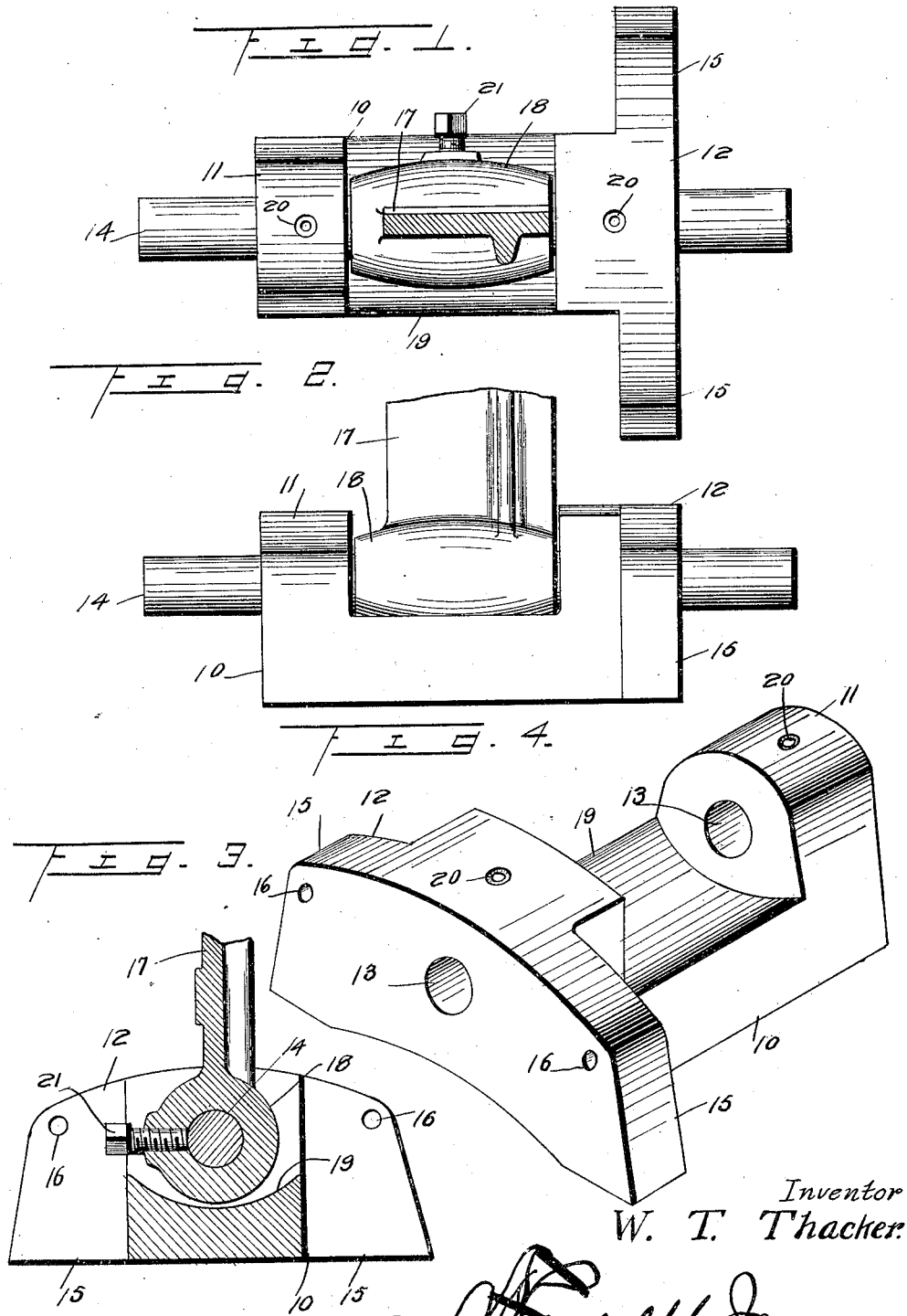

WILLIAM T. THACKER, OF GREENVILLE, SOUTH CAROLINA.

ROCKER-STUD BEARING.

1,348,602.   Specification of Letters Patent.   Patented Aug. 3, 1920.

Application filed October 3, 1919. Serial No. 328,192.

*To all whom it may concern:*

Be it known that I, WILLIAM T. THACKER, a citizen of the United States, residing at Greenville, in the county of Greenville and State of South Carolina, have invented certain new and useful Improvements in Rocker-Stud Bearings; and I do hereby declare the following to be a full, clear, and exact description of the invention, such as will enable others skilled in the art to which it appertains to make and use the same.

This invention relates to an improved bearing for use principally in mounting the sword of a loom but which may be used at any point where it is desired to mount an arm or standard for swinging movement.

By constructing the bearing as shown in the accompanying drawings and brought out in the description there will be provided a bearing in which the rocker stud or shaft may be thoroughly lubricated and thus the sword permitted to have free and easy swinging movement.

This bearing is further so constructed that the oil or other lubricant may be fed to the rocker stud through oil passages in the bearing arms and then collect in the pan beneath the sword between the bearings arms.

Another object of the invention is to so construct this bearing that it will be very solid in construction and strong and durable.

This invention is illustrated in the accompanying drawings, wherein:

Figure 1 is a top plan view of the bearing.
Fig. 2 is a side elevation of the bearing.
Fig. 3 is a transverse sectional view through the bearing.
Fig. 4 is a perspective view of the bearing.

This bearing is formed of a casting having a body indicated in general by the numeral 10 and having its end portion extended upwardly to provide the arms 11 and 12 through which are provided passages 13 to receive the rocker stud or shaft 14. Wings 15 extend transversely of the body from the end portion thereof carrying the bearing arm 12 and are provided with openings 16 through which bolts or other fasteners may be passed to hold the bearing in place. The space between the arms is of sufficient length to permit easy insertion of the end portion of the sword 17 provided with the sleeve 18 and the body between the arms is provided with a concave upper face as shown in Fig. 3 thus providing a pan 19 in which the oil will collect. This oil may be poured directly into the pan and in addition oil may be fed into the passages 13 of the bearing arms 11 and 12 through the oil passages 20. It will thus be seen that when the sword is put in place and secured to the rocker stub through the medium of the set screw 21, it may have the proper swinging movement and the bearing will be very efficiently lubricated.

What is claimed is:

A sword shaft bearing comprising a unitary body provided at its ends with upwardly extending lugs adapted to receive a shaft for rocking movement, the portion of the body lying between the lugs being provided with an upper concaved surface forming an oil retaining pan underneath the lay sword, the body being provided at each end of one of the lugs thereof with wings adapted to be used for attaching the body to the frame of a loom.

In testimony whereof I affix my signature in presence of two witnesses.

WILLIAM T. THACKER.

Witnesses:
W. S. CLARK,
R. L. WELBONE.